INVENTORS
E. G. Smith &
O. M. Cocchiarella
BY [signature]
Atty.

Dec. 11, 1951 E. G. SMITH ET AL 2,578,636

TUBE THICKENER

Filed March 17, 1948 13 Sheets-Sheet 2

INVENTORS
E. G. Smith &
O. M. Cocchiarella
BY [signature]
Atty.

Dec. 11, 1951

E. G. SMITH ET AL 2,578,636

TUBE THICKENER

Filed March 17, 1948

13 Sheets-Sheet 3

INVENTORS
E. G. Smith &
O. M. Cocchiarella
BY [signature]
Atty.

Dec. 11, 1951 E. G. SMITH ET AL 2,578,636

TUBE THICKENER

Filed March 17, 1948 13 Sheets-Sheet 4

INVENTORS
E. G. Smith &
O. M. Cocchiarella

BY [signature]

Atty.

TUBE THICKENER

Filed March 17, 1948 13 Sheets-Sheet 5

INVENTORS
E. G. Smith &
O. M. Cocchiarella
BY
[signature]
Atty.

Dec. 11, 1951 E. G. SMITH ET AL 2,578,636

TUBE THICKENER

Filed March 17, 1948 13 Sheets-Sheet 6

INVENTORS
E. G. Smith &
O. M. Cocchiarella
BY
[signature]
Atty.

INVENTORS
E. G. Smith &
O. M. Cocchiarella
BY
Atty.

Dec. 11, 1951 E. G. SMITH ET AL 2,578,636

TUBE THICKENER

Filed March 17, 1948 13 Sheets-Sheet 8

INVENTORS
E. G. Smith &
O. M. Cocchiarella
BY
[signature]
Atty.

Dec. 11, 1951 E. G. SMITH ET AL 2,578,636

TUBE THICKENER

Filed March 17, 1948 13 Sheets-Sheet 9

INVENTORS
E. G. Smith &
O. M. Cocchiarella
BY
[signature]
Atty.

TUBE THICKENER

Filed March 17, 1948 13 Sheets-Sheet 10

INVENTORS
E. G. Smith &
O. M. Cocchiarella
BY
[signature]
Atty.

TUBE THICKENER

Filed March 17, 1948 13 Sheets-Sheet 11

INVENTORS
E. G. Smith &
O. M. Cocchiarella
BY [signature]
Atty.

INVENTORS
E. G. Smith &
O. M. Cocchiarella
BY [signature]
Atty.

Dec. 11, 1951 E. G. SMITH ET AL 2,578,636

TUBE THICKENER

Filed March 17, 1948 13 Sheets-Sheet 13

INVENTORS
E. G. Smith &
BY O. M. Cocchiarella
[signature]
Atty.

Patented Dec. 11, 1951

2,578,636

UNITED STATES PATENT OFFICE 2,578,636

TUBE THICKENER

Edmund G. Smith, Cedar Grove, and Otell M. Cocchiarella, Newark, N. J., assignors to Equipment Development Co., Inc., Montclair, N. J., a corporation of New Jersey Application March 17, 1948, Serial No. 15,396

15 Claims. (Cl. 210—152)

This invention relates to tube thickeners of the type wherein a tube carrying a filter fabric is immersed in a slurry to be thickened, the filtrate is drawn through the filter fabric and discharged from the tube and the filter cake is removed periodically from the surface of the filter fabric and returned to the slurry.

An object of the invention is to provide a thickener of the above type having novel and improved operating characteristics.

Another object is to provide a thickener of the above type having improved filtering efficiency.

Another object is to provide novel and improved means for removing the filter cake from the filter fabric.

Another object is to provide a novel and improved thickening cycle.

Various other objects and advantages will be apparent as the nature of the invention is more fully disclosed.

In accordance with the present invention a plurality of filter tubes are supported in the slurry from a header which is arranged to be oscillated about a vertical axis so as to cause the tubes to oscillate laterally in the slurry. The filter fabric is wrapped around spacers which space the same from the surface of the tube to form a suction chamber therebetween and is secured at its side edges so that it is free for independent movement except along the longitudinal line where the edges are secured.

In the thickening cycle suction is applied to the inside of the tube to draw filtrate through the filter fabric and into the suction chamber between the filter fabric and the tube surface, thence into the tubes themselves, from which it is removed to the header. At the end of the filtering period the suction is cut off from the header and liquid is forced back into the tubes to equalize the pressure on the two sides of the filter fabric or to produce a slight excess in pressure on the inside so as to cause the fabric to balloon out away from the spacers. The tubes are then oscillated in the surrounding slurry to dislodge the filter cake which then drops downwardly in the slurry after which the oscillation is stopped and suction is again applied to the tubes and the above cycle is repeated. Inasmuch as the filtering efficiency is the highest at the beginning of the filtering period, before the filter cake has built up to any substantial extent, it is evident by interrupting the filtering cycle frequently and removing the filter cake, the filter fabric is used to its maximum efficiency at all times.

In accordance with the present invention, special timing means are used to control accurately the various stages of the operating cycle. The timing means includes adjustable cams which may be set in accordance with the timing required.

Another feature of the present invention involves the method of dislodging the filter cake from the filter fabric. Because the filter fabric is attached rigidly at only one point around its periphery, the remainder of the fabric is free to balloon out and to distort as the tube is moved through the surrounding liquid. During the suction period the fabric is held tightly against the spacing members. During the blow-back period the pressure differential is removed or a slight pressure may be built up within the tube so that the entire fabric is caused to balloon out to a certain extent away from the spacing members. This in itself serves to loosen the filter cake from the outside of the fabric. However, as soon as the fabric is thus ballooned out, the tube is oscillated, thereby forcing the fabric laterally back and forth through the surrounding liquid. This causes the fabric to balloon out on the trailing side of the tube which of course is rapidly reversed in position as the tubes oscillate. This distortion of the fabric serves to dislodge the filter cake and causes the same to drop off from the outside of the fabric and fall to the bottom of the tank. Hence the fabric is maintained comparatively clean without the use of scrapers or other instruments which tend to damage the same.

Although the novel features which are characteristic of this invention are pointed out more particularly in the claims, the nature of the invention will be better understood by referring to the following description, taken in connection with the accompanying drawings in which a specific embodiment thereof has been set forth for purposes of illustration.

In the drawings:

Fig. 1 is a side elevation of the upper portion of a thickening tank embodying the present invention;

Fig. 1*a* is a side elevation of the lower portion of the tank shown on a smaller scale than Fig. 1;

Fig. 2 is an end elevation thereof;

Fig. 2*a* is an end elevation of the lower portion of the tank;

Figures 13, 14, 15, 16, 17:
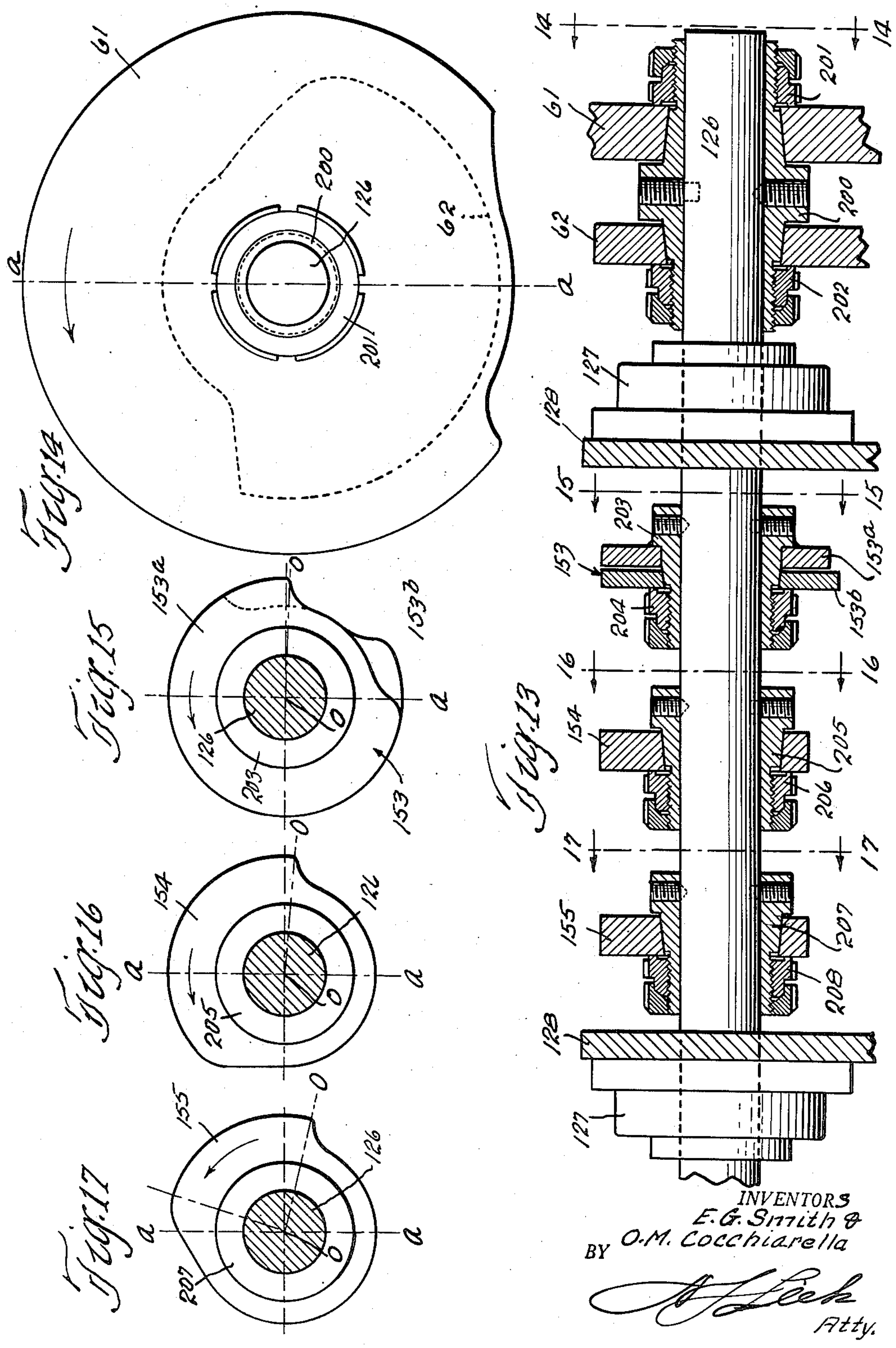
Fig. 13 is a detail view of the cam shaft.
Figures 18, 19, 20:
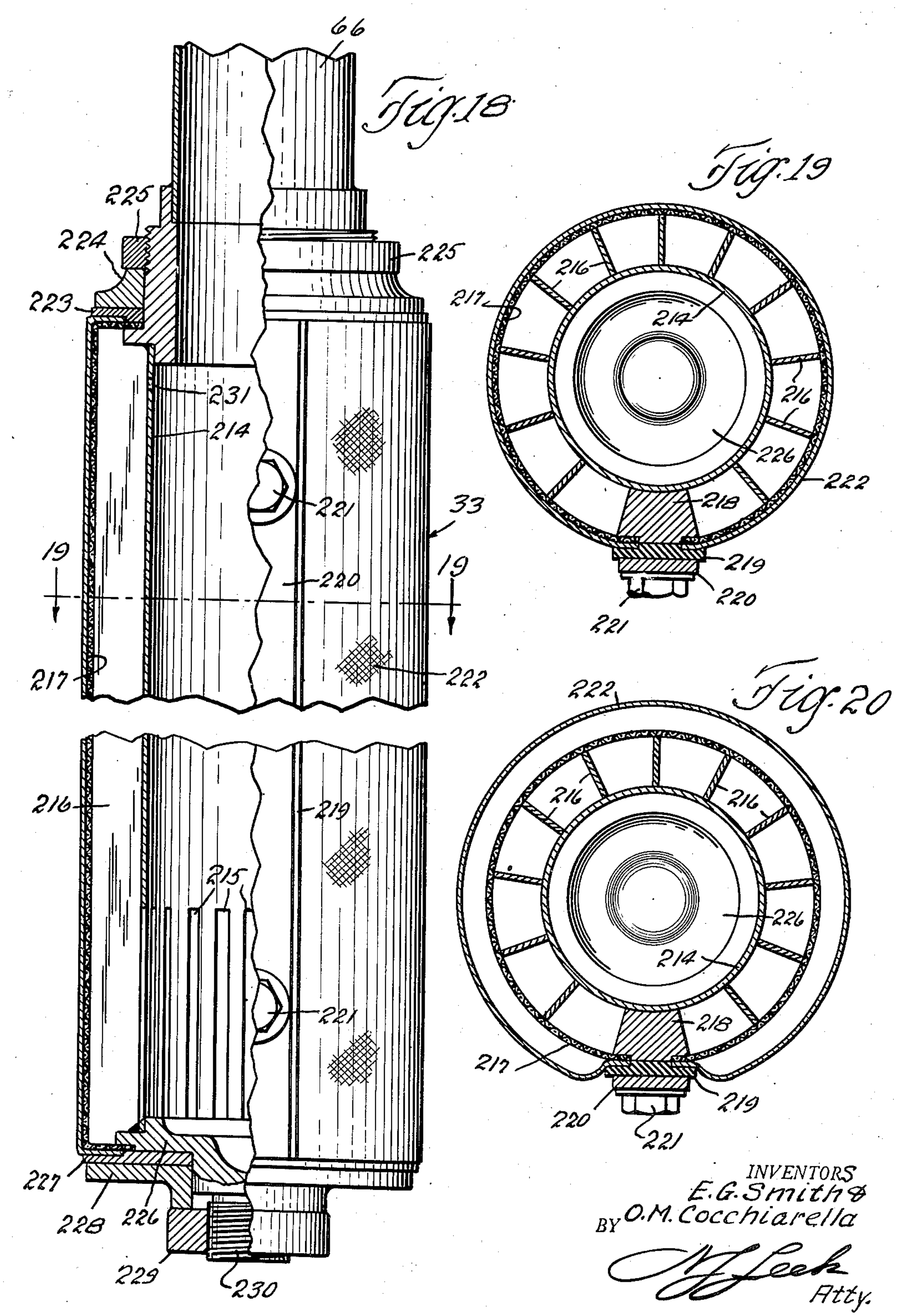

Figs. 14, 15, 16 and 17 are sections taken on the line 14—14, 15—15, 16—16 and 17—17 respectively, of Fig. 13 illustrating the relative positions of the various cams;

Fig. 18 is a detail view of a thickener tube;

Fig. 19 is a section taken on the line 19—19 of Fig. 18 showing the position of the filtering fabric during the filtering period;

Fig. 20 is a horizontal section similar to Fig. 19 showing the position of the filter fabric during the blow-back period.

Figure 22:
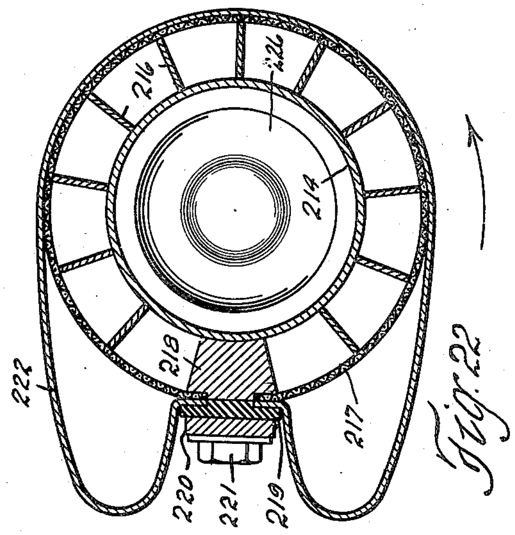
Figure 21:
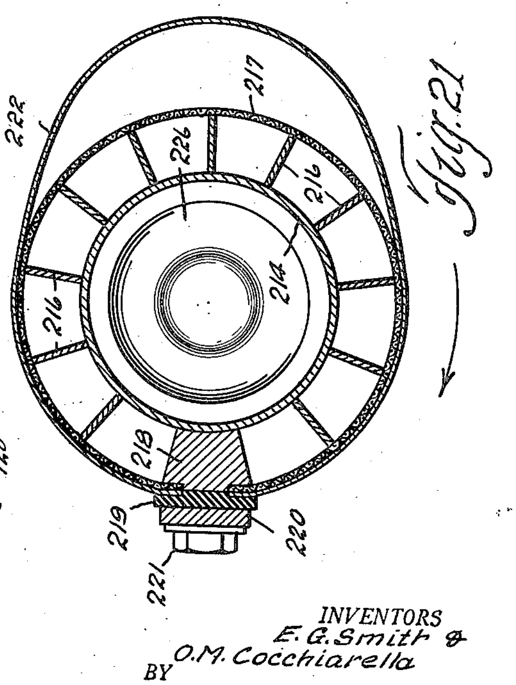
Figure 23:
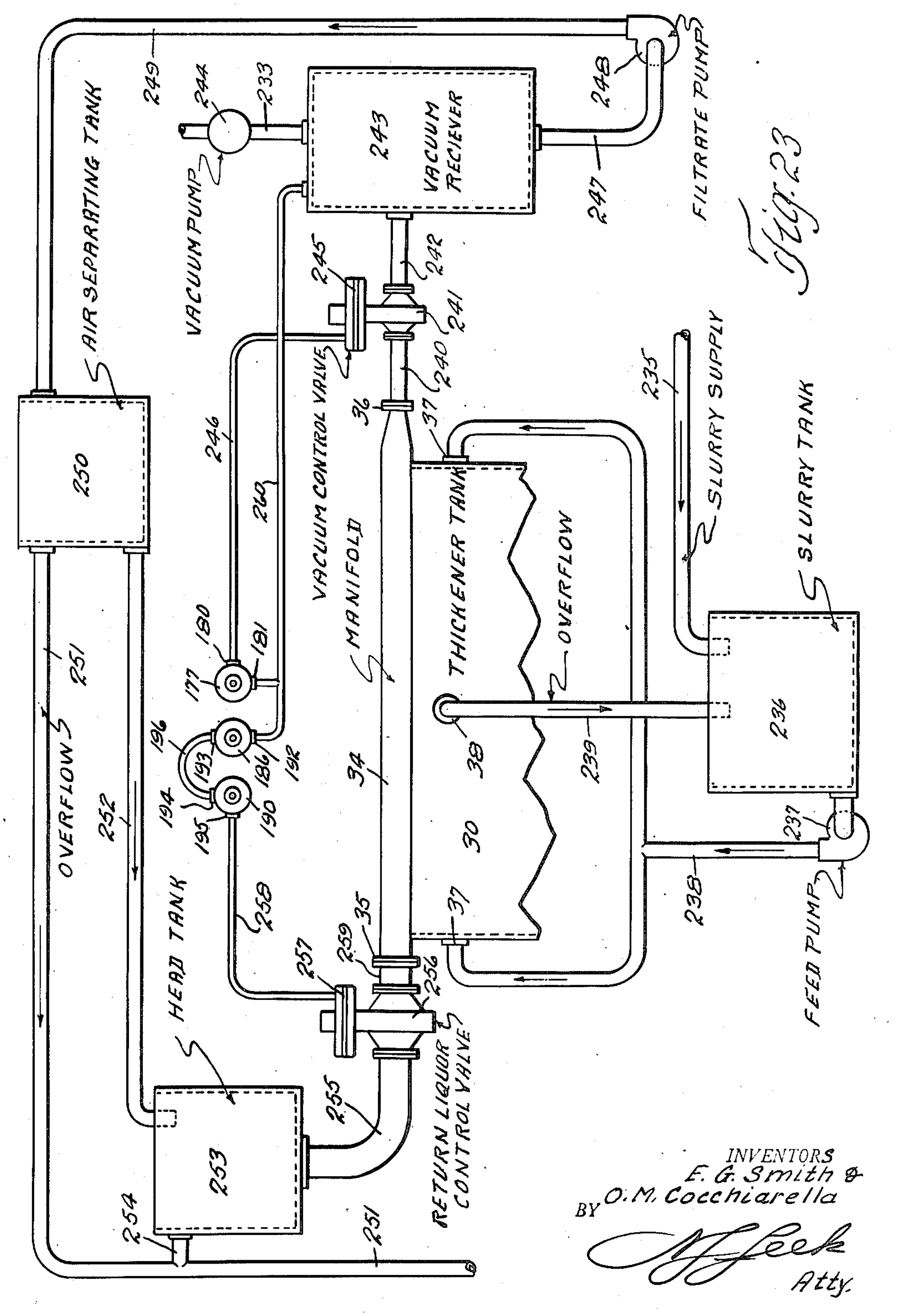

Figs. 21 and 22 are similar sections showing the position of the filter fabric during the oscillating period; and Fig. 23 is a diagrammatic view illustrating the complete system.

Figure 1:
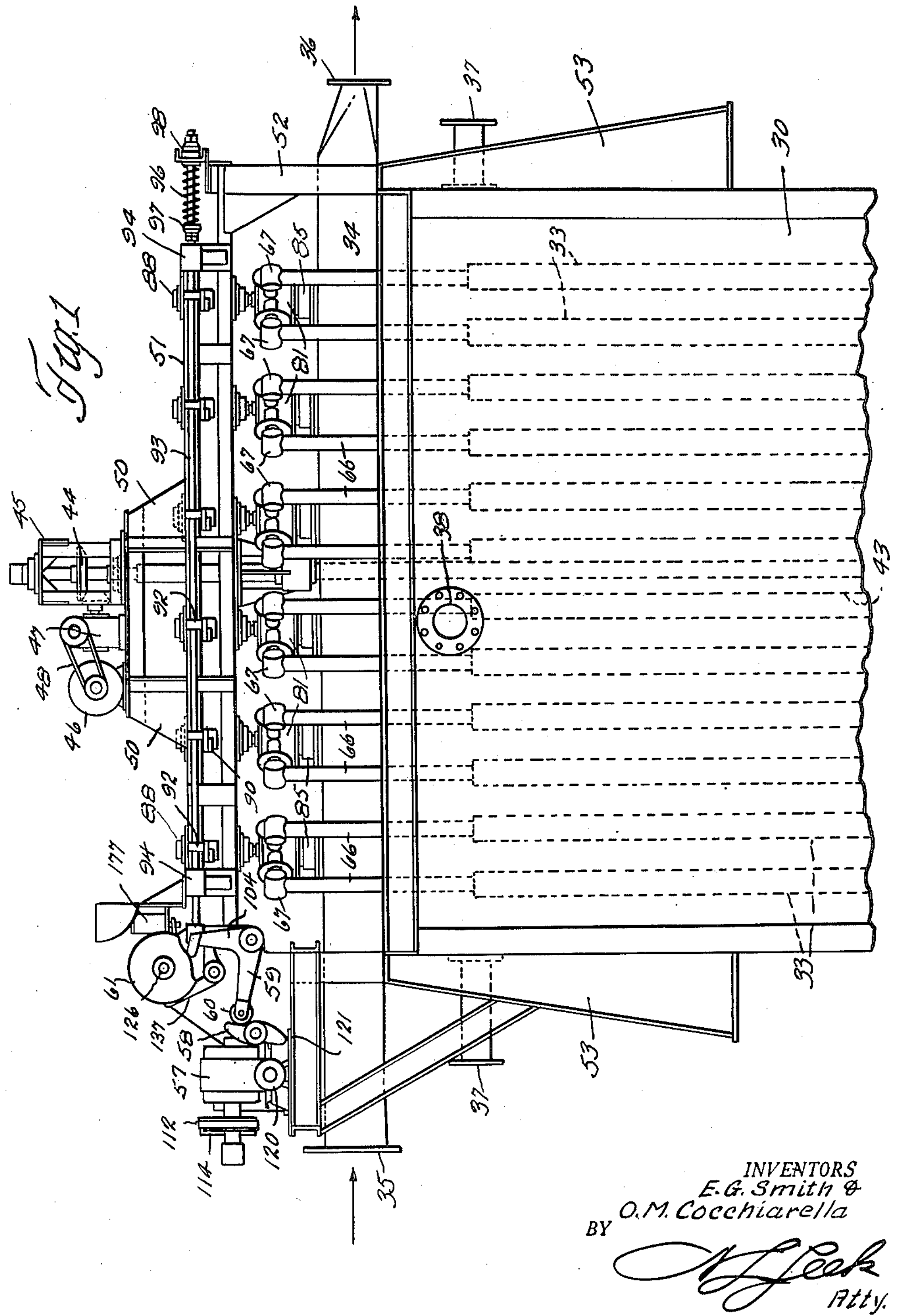
Figures 1A, 2, 2A:
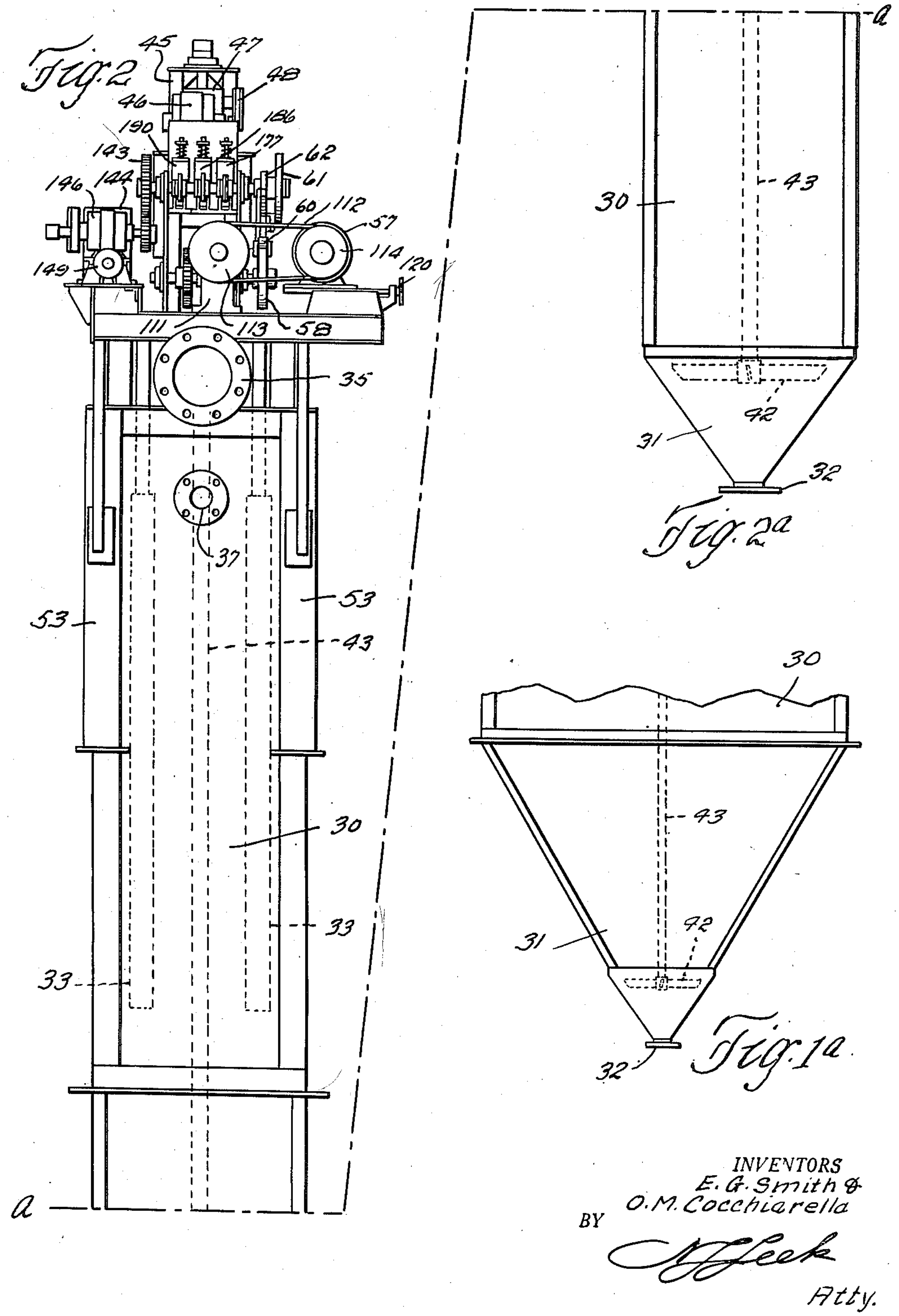
Figure 3:
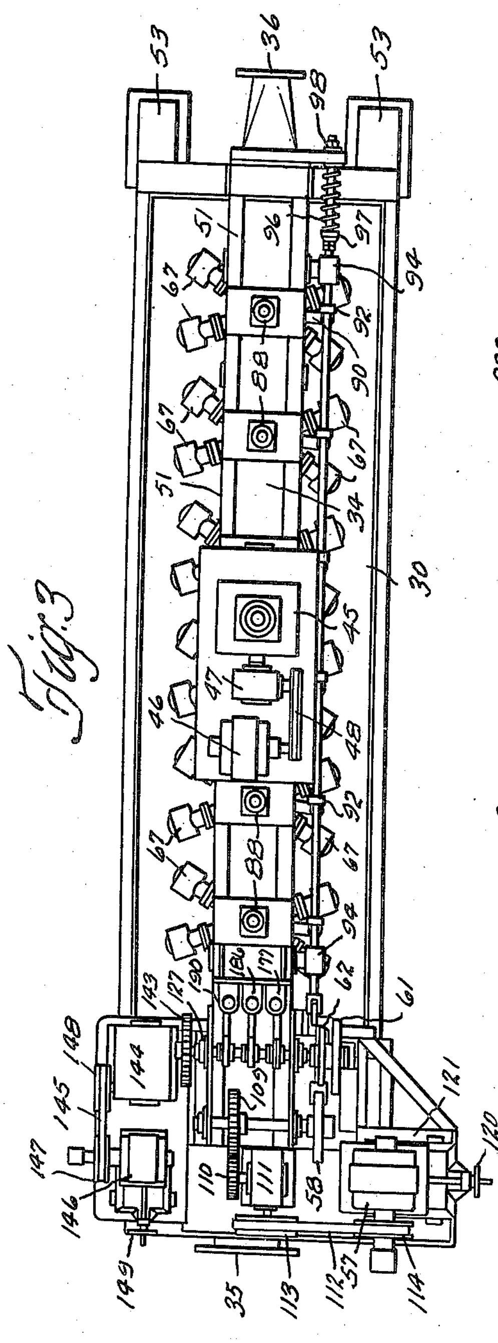
Fig. 3 is a top plan view of the thickener.

Referring first to Figs. 1, 2 and 3, the thickener is shown as comprising a tank 30 of rectangular section containing the slurry to be thickened and terminating at the bottom in a cone-shaped hopper 31 having an outlet 32 through which the thickened material may be removed when desired. A plurality of tube filters 33 are supported vertically in the slurry in the tank 30 and are connected to a horizontal manifold 34 having an inlet end 35 adapted to be connected to a source of return liquor and an outlet end 36 adapted to be connected to a source of suction. The tank 30 is provided with inlet connectors 37 through which the slurry is fed to the tank and with an overflow connector 38 for maintaining the liquid at the desired level. A stirrer 42, such as a paddle wheel is mounted on a vertical shaft 43 which extends upwardly through the tank 30 and is driven by a motor 46 through a reduction gear 47 and a gear train 44 mounted on a bracket 45. The reduction gear 47 is connected to the motor 46 by driving belt 48. The driving motor, reduction gear, and gear train are supported on brackets 50 which in turn are mounted on a horizontal frame 51 carried by uprights 52 from a supporting frame 53 which is adapted to rest upon suitable supporting beams not shown.

The tube filters 33 are mounted to be oscillated in the manner to be described and are driven by a motor 57 through a rotating cam 58, a rocker arm 59 having a cam follower 60 and a timing mechanism including cams 61 and 62, all of which will be more fully described.

Figure 8:
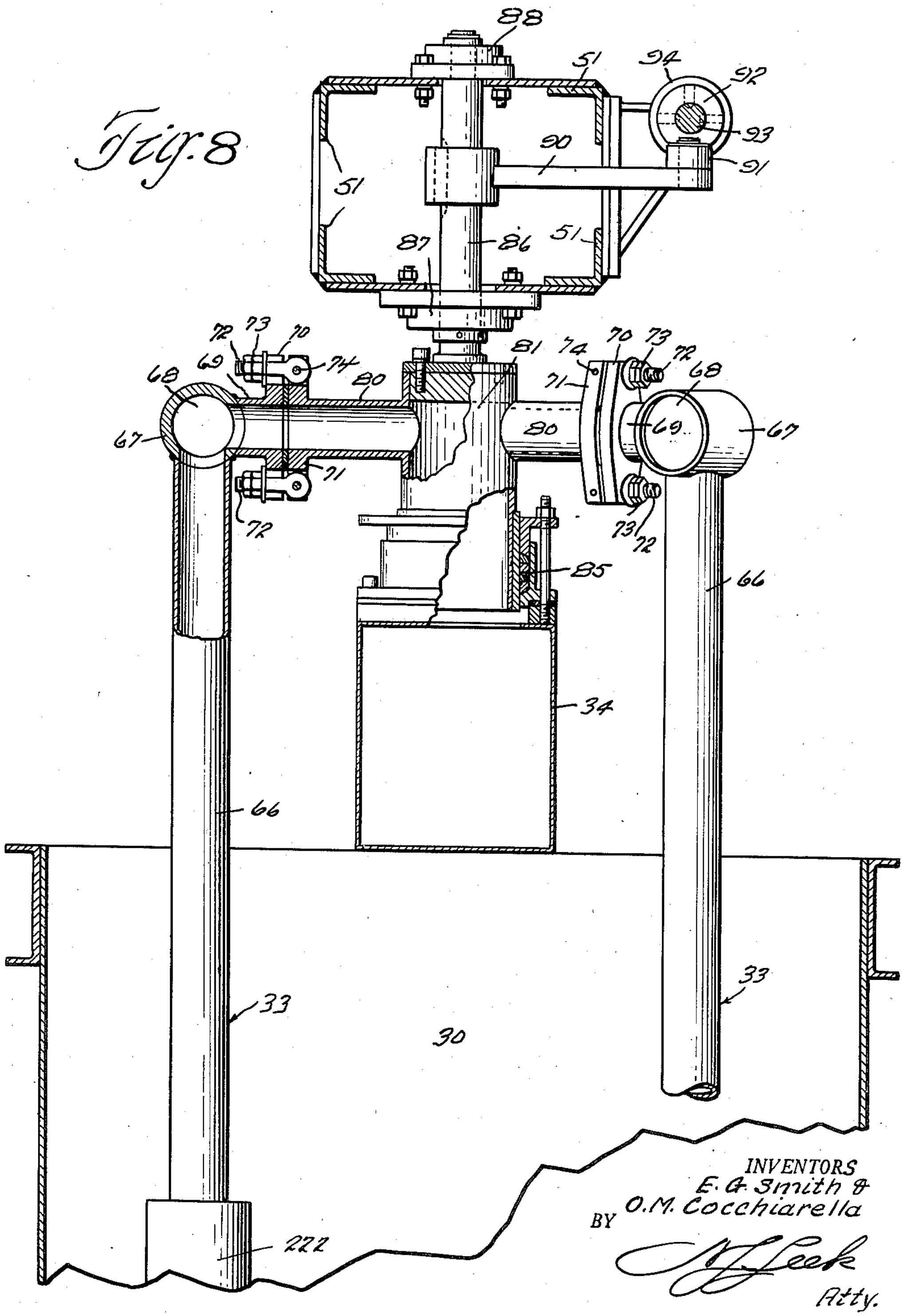
Fig. 8 is a vertical section taken on the line 8—8 of Fig. 7 showing the thickener tubes and header.

Referring now to Fig. 8, the tube filters 33 include vertical tubes 66 which are attached at their upper ends to horizontal cylinders 67 carrying sight glasses 68, which in turn are attached to radial tubes 69 carrying flanges 70. The flanges 70 are connected to flanges 71 by means of bolts 72 carrying clamping nuts 73 and pivoted at 74 to the flanges 71. The bolts 72 extend through vertical slots in the flanges 70 so that the flanges 70 may be released by loosening the nuts 73 and pivoting the bolts 72 about their pivots 74.

The flanges 71 are connected to radial tubes 80 which in turn are connected to a rotatable vertical header 81. The header 81 is open at the bottom to the manifold 34. It rotates in a stuffing box 82 on the manifold and is sealed to the manifold by means of a packing 85. At its upper end the header 81 carries a rod 86 which is supported in bearings 87 and 88 in the frame 51. The bearing 88 is preferably a thrust bearing adapted to support the weight of the header 81 and tube filters 33.

Figure 7:
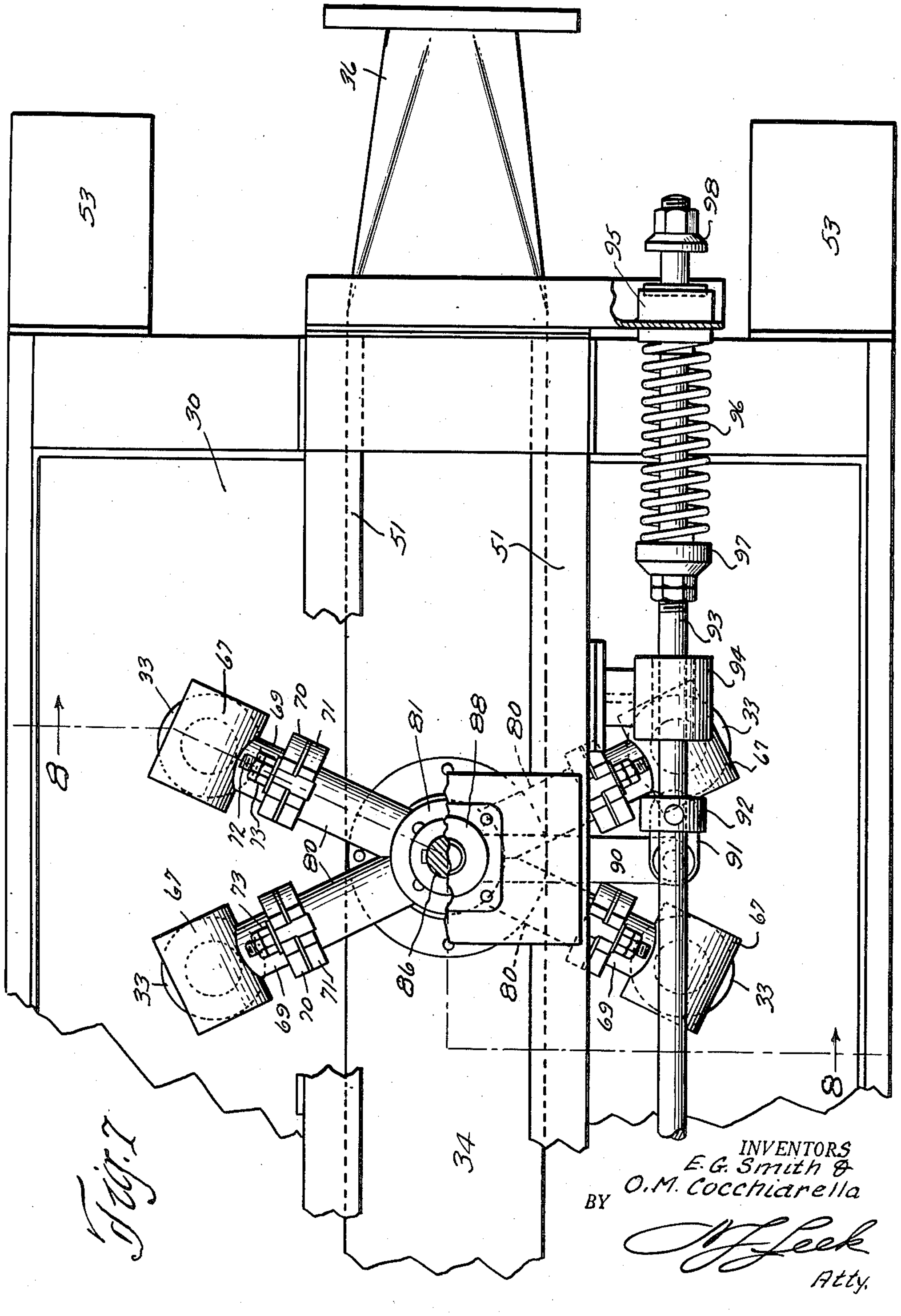
Fig. 7 is a partial top plan view of the end of the thickener opposite the shaking mechanism.

The shaft 86 is connected to be oscillated by means of a lever 90 which carries at its end a pivoted link 91 (Fig. 7) attached by a collar 92 to a rod 93 which is slidably mounted in bearings 94 (Figs. 1 and 7) and extends the entire length of the tank. At its righthand end, as seen in Figs. 1 and 7, the rod 93 extends through a bearing 95 mounted on the end frame of the machine and is urged to the left by means of a compression spring 96 which extends between the bearing 95 and an adjustable collar 97 secured to the rod 93. An adjustable stop collar 98 is threaded on the end of the rod 93 to limit the movement thereof.

At its lefthand end (Figs. 1, 4 and 6) the rod 93 carries a yoke 100 which is pinned by a pin 101 to a link 102 which in turn is pinned by a pin 103 to a lever 104 attached to the rocker arm 59 and arranged so that rocking of the arm 59 by means of the cam 58 serves to reciprocate the rod 93 which in turn causes the tube filters 33 to oscillate about the axes of the shafts 86.

Figure 6:
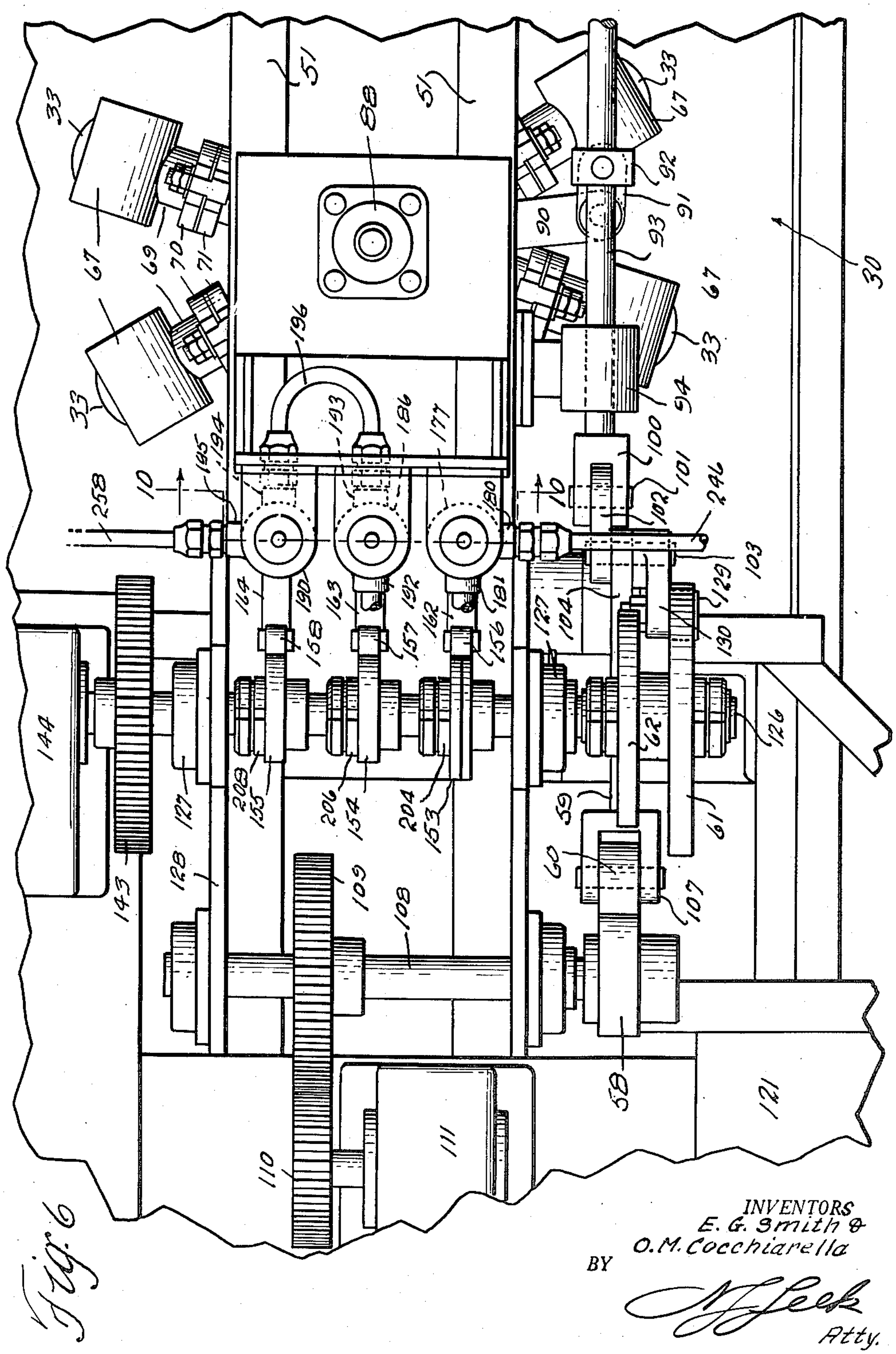
Fig. 6 is a plan view of the cam shaft, driving mechanism and valve operating mechanism.

Referring to Fig. 6, the cam follower 60 is shown as mounted in a yoke 107 carried by the end of the rocker arm 59. The cam 58 is mounted on a shaft 108 journaled in bearings in the frame 51 and driven by gears 109 and 110 through a reduction gear 111 (Fig. 3) which is driven by a belt 112 from the motor 57. The belt 112 is carried on sheaves 113 and 114 which constitute a Reeves drive and are adjustable to vary the speed of the cam 58. An adjusting wheel 120 of the usual type may be provided for varying the drive ratio of the Reeves drive mechanism.

It will be noted that the spring 96 tends to hold the cam follower 60 in contact with the cam 58 to effect the above mentioned oscillating movement or shaking of the tube filters 33. The motor 57 and associated driving mechanisms are supported on a frame 121 (Fig. 1) carried by the end frame 53.

Figure 4:
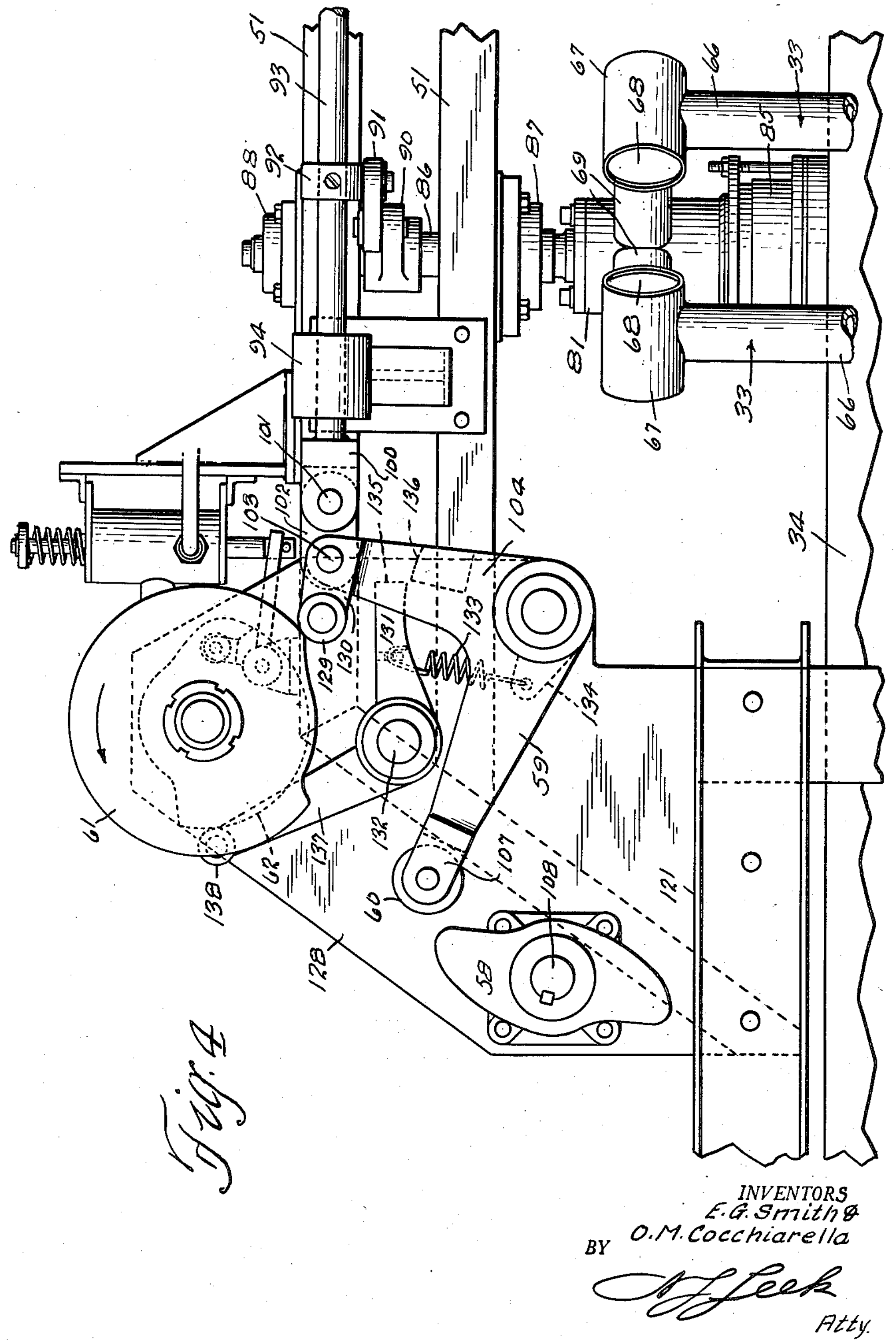
Fig. 4 is a detail view of the shaking mechanism on a larger scale than Figs. 1 to 3.
Figure 5:
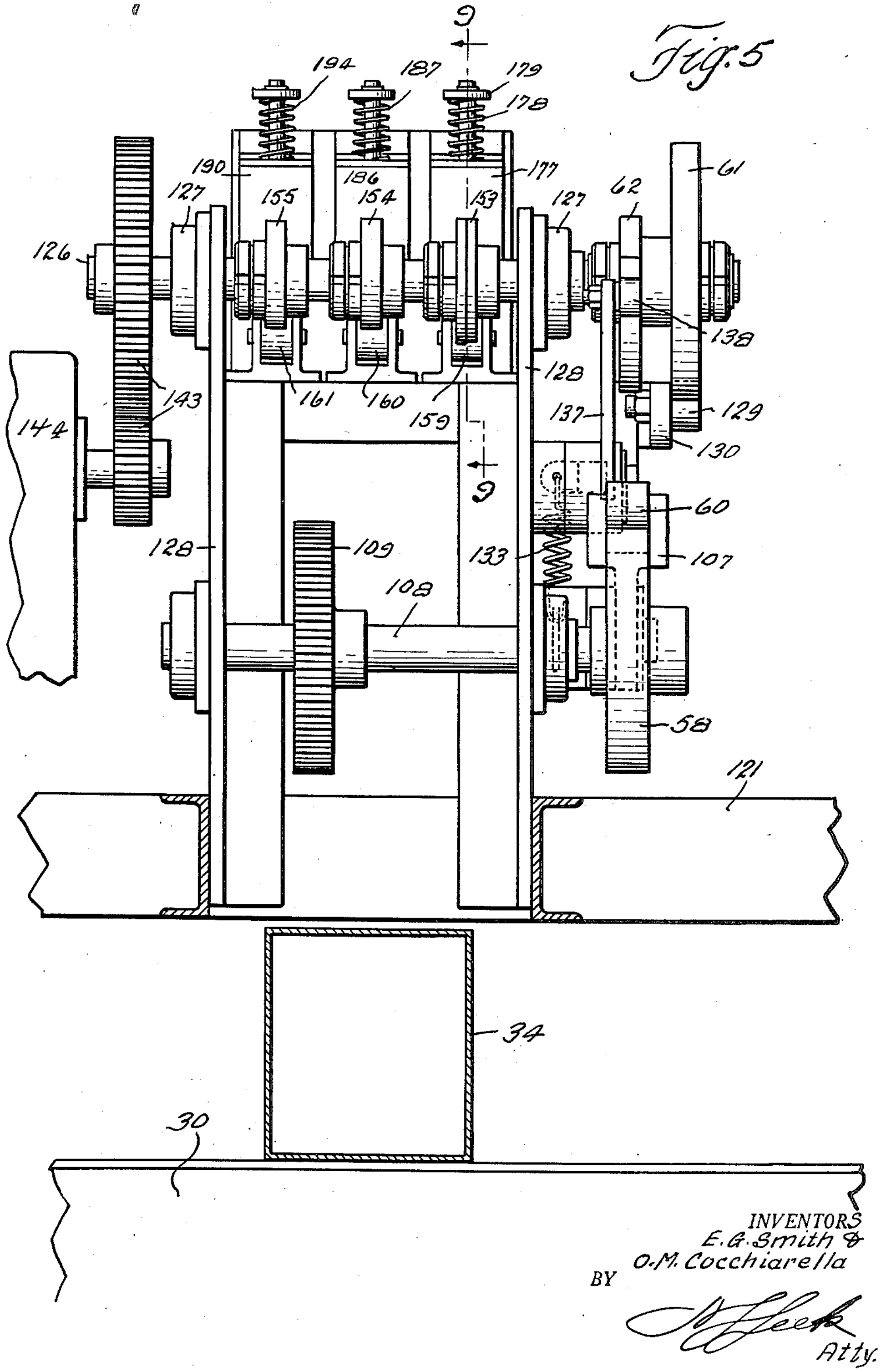
Fig. 5 is a vertical section showing the shaking mechanism and cam shaft.

Referring now to Figs. 4, 5 and 6, the cams 61 and 62 are mounted on a cam shaft 126 which in turn is mounted in suitable bearings 127 in a frame 128.

The cam 61 is adapted to engage a cam follower 129 carried on an arm 130 attached to the lever 104 and is adapted, when the cam follower 129 is in contact with the high portion of the cam 61, to hold the lever 104 to the right as seen in Fig. 4, thereby bringing the cam follower 60 out of engagement with the cam 58 and preventing reciprocation of the rod 93. The cam 61 is driven in counterclockwise direction as seen in Fig. 4 and is adapted, when the cam reaches the position shown in Fig. 4, to permit the follower 129 to drop onto the low portion of the cam 61 so as to release the lever 104 and allow the follower 60 to engage the constantly driven cam 58 and initiate the shaking of the tubes.

In order to interrupt the shaking of the tubes after a predetermined controlled period, a lever 131 is pivotally mounted about a pin 132 and is normally held down by a spring 133 which is anchored to a fixed ear 134. The end 135 of the lever 131 is adapted to engage an abutment 136 attached to the lever 104 to latch the lever 104 against further movement when the lever 131 is in its lower position.

The lever 131 is attached to an actuating arm 137 carrying a cam follower 138 which in turn engages the cam 62 and is normally held in a counterclockwise position as seen in Fig. 4 by the high portion of the cam 62. In this position the end 135 of the lever 131 is elevated out of alignment with the abutment 136 so that the lever 131 is inoperative and the lever 104 is allowed to oscillate provided the cam follower 129 is opposite the low portion of the cam 61. However, as soon as the follower 138 reaches the low portion of the cam 62, the spring 133 tends to shift the lever 131 and arm 137 in a clockwise direction. If at this instant the lever 104 is oscillating and is in a position other than at the extreme right, the end 135 with the lever 131 rides on the top surface of the abutment 136. As soon as the oscillation of the lever 104 shifts the lever to its extreme righthand position, the end 135 of the lever 131 rides off of the end of the top surface of the abutment 136 whereupon the spring 133 pulls the lever 131 downwardly into alignment with the abutment 136 to latch the lever 104 in its extreme righthand position and prevent further reciprocation of the lever 104 and of the rod 93.

On continued rotation of cams 61 and 62, the cam follower 129 rides onto the high portion of the cam 61 thereby retracting the lever 104 regardless of the position of the lever 131. The cam follower 138 then rides onto the high portion of the cam 62 to release the lever 131 from the abutment 136 and conditions the apparatus for further oscillation when the follower 129 again rides off the high portion of the cam 61.

It will be noted that the period of oscillation may be adjusted by shifting the relative positions of the cams 61 and 62 so as to occupy any desired portion of the complete operating cycle.

Referring to Figs. 3 and 5, the cam shaft 126 is driven by gears 143 through a reducing gear 144 which in turn is driven through a belt 145 by a driving motor 146. The belt 145 engages sheaves 147 and 148 which are adjustable as a Reeves drive by means of an adjusting handle 149 for varying the speed of rotation of the cam shaft 126.

Figure 9:
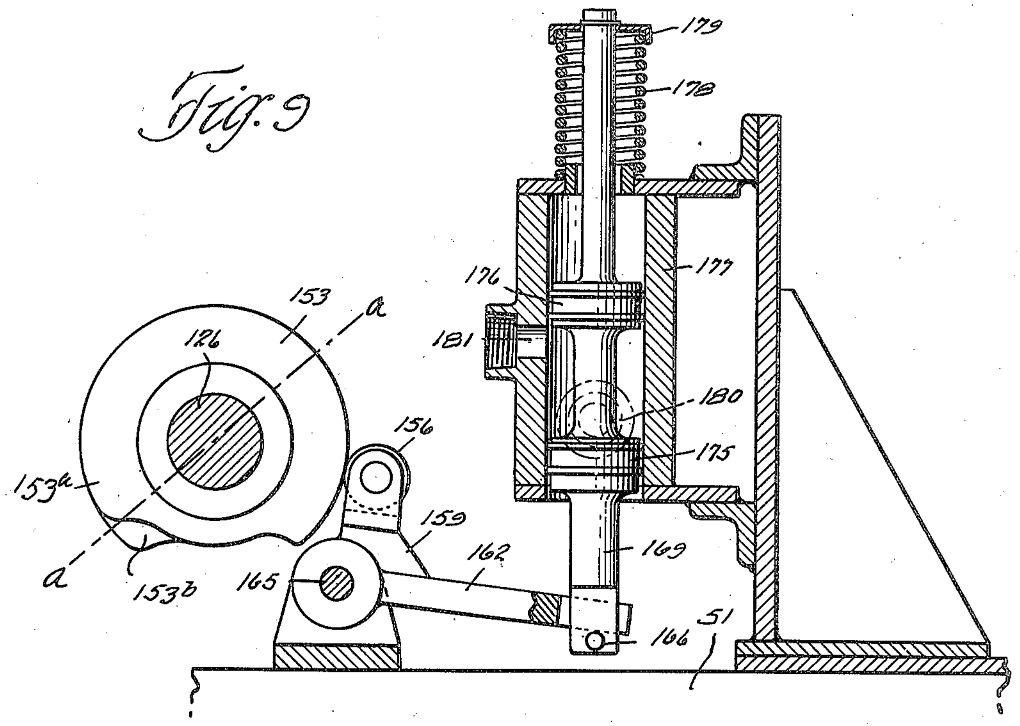
Fig. 9 is a detail view of the valve operating mechanism.

Referring to Figs. 5, 6 and 9 the cam shaft 126 also carries cams 153, 154 and 155 which actuate respectively cam followers 156, 157 and 158 mounted by brackets 159, 160 and 161 on arms 162, 163 and 164 respectively. The arms 162, 163 and 164 are pivoted about a horizontal rod 165 and at their ends engage pins 166, 167 and 168 (Fig. 10) carried respectively in the lower ends of valve rods 169, 170 and 171. The valve rod 169 is connected to actuate pistons 175 and 176 sliding in a cylinder 177. The rod 169 projects beyond the cylinder 177 and is urged upwardly by a compression spring 178 seated between the end of the cylinder 177 and a cap 179 mounted on the end of the rod 169. The cylinder 177 is provided with an outlet port 180 and with an inlet port 181 which are arranged so that communication therebetween is established when the piston 175 is in its lower position, but is interrupted when the piston 175 is elevated. The high portion of the cam 153 engaging the cam follower 156 serves to hold the valve rod 169 in its lower position. When the follower 156 rides off of the high portion of the cam 153, however, the spring 178 shifts the valve rod 169 quickly to its upper position.

Similarly, the valve rod 170 carries pistons 184 and 185 which are mounted to slide in a cylinder 186 and are held in their upward position by a spring 187. The valve rod 171 carries pistons 188 and 189 which slide in a cylinder 190 and are normally held in their upper position by a spring 191. The cylinder 186 is provided with an inlet port 192 and an outlet port 193. The cylinder 190 is provided with an inlet port 194 and with an outlet port 195. The outlet port 193 of the cylinder 186 and the inlet port 194 of the cylinder 190 are connected by a pipe 196.

Referring now to Figs. 13 to 17, it will be noted that the cams 61 and 62 are mounted on a conical hub 200 and are clamped against the conical surfaces of the hub 200 by means of nuts 201 and 202 respectively. The cam 153 is shown as a split cam comprising parts 153*a* and 153*b*. The part 153*a* is fixed as by welding to a hub 203. The part 153*b* engages a conical surface of the hub 203 and is clamped thereto by means of a clamping nut 204. The cam 154 engages the conical surface of a hub 205 and is clamped by a clamping nut 206. The cam 155 engages the conical surface of a hub 207 and is clamped by a clamping nut 208. The various hubs are fixed on the shaft 126 by means of suitable clamping screws. The arrangement is such that the relative positions of the various cams 61, 62, 153*b*, 154 and 155 may all be adjusted with respect to the fixed cam 153*a* which serves as a reference point. The split cam 153, as indicated in Fig. 15, permits adjustment of the actual dwell of the cam follower in the low portion of the cam.

Referring to Figs. 18 and 19, at its lower end the tube 66 is shown as carrying a filter tube 214 which may be welded thereto and is provided at its lower end with a plurality of slots 215 and carries on its external surface a plurality of spaced radial fins 216 which constitute spacing members. A backing fabric such as a wire screen 217 is wrapped around the peripheral surfaces of the fins 216 and is secured at its side edges to a vertical bar 218 by suitable means such as solder. If made of non-metallic material its side edges may be overlapped and secured by means of a strip gasket 219, a clamping strip 220, and bolts 221. A filter fabric 222 of suitable filter material, such as filter cloth of the type described in the copending application of Edmund G. Smith, Serial No. 706,994, filed October 31, 1946 for Filter Cloth, now abandoned, is wrapped around the backing fabric 217 and its side edges are secured between the gasket 219 and the bar 218. The side edges may be overlapped under the strip gasket 219. The upper ends of the fabrics 217 and 222 may be folded over the tops of the fins 216 and secured by a gasket 223 and a clamping ring 224 engaged by a clamping nut 225. The lower ends of the fabrics may be folded under the lower ends of the fins 216 and clamped against a bottom plate 226 of the tube by means of a gasket 227, clamping ring 228, and nut 229 threaded on a bolt 230 which is attached to the bottom plate 226. The plate 226 may be welded to the bottom of the tube to serve as bottom closure therefor. A vent 231 is provided at the upper part of the tube to prevent an air lock from forming in the filtrate space during the blow-back periods.

Referring now to Fig. 23, the slurry to be thickened is fed from a pipe 235 into a slurry tank 236 from which it is pumped by means of a pump 237 through a pipe 238 to the inlet connectors 37 of the thickener tank 30. Any overflow from the thickener tank is removed from the overflow connector 38 through a pipe 239 and returned to the slurry tank 236.

The outlet end of the manifold 34 is connected by a pipe 240 to a control valve 241, thence by a pipe 242 to a vacuum receiver 243 which in turn is connected to a vacuum pump 244 by means of a pipe 233. The control valve 241 is of the quick-acting diaphragm type having a diaphragm 245 connected to be actuated by suction supplied by a suction pipe 246 so that the valve 241 is opened only when suction is applied to the diaphragm 245 through the pipe 246 by operation of the pistons 175 and 176 in cylinder 177. The vacuum receiver 243 is connected by a pipe 247 to a filtrate pump 248 which in turn is connected by a pipe 249 to feed the filtrate to an air separating tank 250 which is of sufficient size to permit detention of the filtrate so that entrained air will separate and the liquor carried to tank 253 by pipe 252 will be free from entrained air. The overflow from the tank 250 is taken by an overflow pipe 251. The tank 250 is connected by a pipe 252 to a head tank 253, the overflow of which is connected by a pipe 254 to the overflow pipe 251. The head tank 253 feeds by a pipe 255 to a return liquid control valve 256 which is of the quick-acting vacuum-operated type having a diaphragm 257 controlled by the suction in a pipe 258 under the control of pistons 184 and 185 in cylinder 186 and pistons 188 and 189 in cylinder 190. The valve 256 in turn is connected by a pipe 259 to the inlet end 35 of the manifold 34.

The vacuum pipe 246 is connected to the port 180 of the cylinder 177. The vacuum pipe 258 is connected to the port 195 of the cylinder 190. The port 192 of the cylinder 186 and the port 181 of the cylinder 177 are connected by a pipe 260 to the vacuum receiver 243 to supply vacuum to the respective cylinders. The return liquid control valve 256 is of the quick-acting type which is adapted to open and close practically instantaneously in response to the control of the diaphragm 257 and may be of the type shown in our copending application Serial No. 8146, filed February 13, 1948, for Quick Acting Valve. The arrangement is such that the valve 256 is opened when suction is applied through the pipe 258 to the diaphragm 257.

*Operation*

The above described thickener is intended to operate in a three-step cycle involving first filtering, second blow-back, third shaking the filter tube to remove the filter cake. The cycle may be of any length desired depending upon the nature of the material being thickened. A cycle of 40 seconds may be used in certain instances in which case suction may be applied during the filtering step for 34 seconds of the cycle, blow-back may be applied for about 1½ seconds, and shaking may involve 2½ seconds, the remainder of the time representing the period of changing from one step to the next. The tubes may be oscillated at a rate of 60 oscillations per minute in which event two complete oscillations will take place in the 2½ second oscillation period.

Referring to Fig. 23, assume that the slurry tank 236 is maintained full of the slurry and the feed pump 237 is operating to maintain the thickener tank 30 full of the slurry for thickening, any excess overflowing through the pipe 239. During the filtering cycle the valve 256 is closed and the valve 241 opened and suction is applied from the vacuum receiver through the valve 241 to the manifold 34, thence to the various tube filters 33. This suction causes filtrate to be drawn into the tubes through the filter cloth 222, whence it flows downwardly through the space between the fins 216 and through the slots 215 into the tube 214, whence it is drawn by suction through the tube 66 to the manifold 34 and into the vacuum receiver 243. From the receiver 243 the liquor is pumped by the pump 248 to the air separation tank 250.

Air or gas is always entrained in the filtrate removed from a vacuum filtration system. The entrainment occurs due to the intermixing that takes place in the internal lines of the tube and connecting pipes and also from the emulsifying action of the filtrate pump. This entrained air or gas separates very slowly from the liquor, particularly when solubles are present. If the filtrate is not passed through a separating tank so that the liquor returned to the thickener, for creating a head to force liquor back into the tubes may lose this entrained air or gas, the liquor may have a specific gravity so low that it can not create the required head unless the head tank 253 is raised beyond a practical height. If the head tank is raised too high, excessive pressure is developed on the cloth should the head tank suddenly receive heavy liquor, as when starting up. The cloth may then be stretched and the volume of return liquor required increased appreciably.

At the end of the predetermined time, so selected that a filter cake has been built up on the filter cloth 222, the valve 241 is closed by operation of the cam 153 and the valve 256 opened by operation of the cam 154. When the valve 256 is opened, liquid flows from the head tank 253 under the head of the liquid in that tank through the pipe 255 into the manifold 34 and thence to the interior of the various tubes 33. The pipe 255 and manifold 34 are of large diameter so that the liquid surges back and fills the various tubes in a minimum time. For example, the liquid may flow at the rate of 20 gallons per second. Inasmuch as the tubes are already full of the filtrate only a relatively small quantity of return liquid is required for filling the system, breaking the suction on the tubes, and feeding back to balloon out the fabric. The valve 256 must have sufficient capacity to pass the liquid at this maximum rate and must be capable of closing substantially instantaneously when sufficient liquid has passed therethrough. A quick-closing valve of the type referred to in our co-pending application Serial No. 8146, above-identified is suitable for this purpose.

The liquid is fed back until the pressure within and without the tubes 33 is equalized and a slight excess of pressure is developed within the tubes. This results in causing the filter fabric 222 to balloon out away from the backing screen 217 as indicated in Fig. 20. It will be noted that as the fabric is secured only at one point, it is free to balloon out around practically the entire surface of the tube. In this way the fabric is stretched and the filter cake is loosened. The valve 256 is now closed by operation of the cam 155 and the tubes are oscillated. The oscillation of the tubes causes them to move first in one direction and then the other through the slurry, which in turn causes the loose fabric to balloon out in back of the tubes as indicated in Figs. 21 and 22, first on one side and then on the other as the tubes are moved in alternate directions. This ballooning out of the fabric further distorts the cake and causes the same to fall from the surface thereof into the hopper at the bottom of the slurry tank. Usually two complete oscillations are sufficient for this purpose.

After the predetermined period of oscillation, the tubes are again brought to rest and the valve 241 is again opened by operation of the cam 153 to begin the filtering operation of the next cycle. This cycle of operation is repeated in controlled sequence for each rotation of the cam shaft 126.

In the discharge period some liquor passes through the filter cloth as it changes from a circular to an elliptical shape. The use of a cloudy liquor in ballooning out the cloth is objectionable since it sometimes leaves a deposit of solids on the inside of the cloth and retards the flow of liquor through the cloth and interferes with discharge of the filter cake.

The internal volume of the tube 214, the cylinder 67, the pipe line 69 and pipe line 80 is so designed that their combined capacity is greater than the amount of liquor required to balloon out the cloth and to provide for any amount allowed to pass through the cloth 222 during the discharge operation. In this way, if the filter cloth on one or more tubes should develop a hole, producing cloudy filtrate in the horizontal manifold 34, there will always be sufficient clear filtrate in the individual tube and pipe line to perform the desired function, without ever getting any solids back against the inside of the cloth. Hence a defective cloth on one or more tubes will not interfere with the operation of the other tubes.

Figure 10:
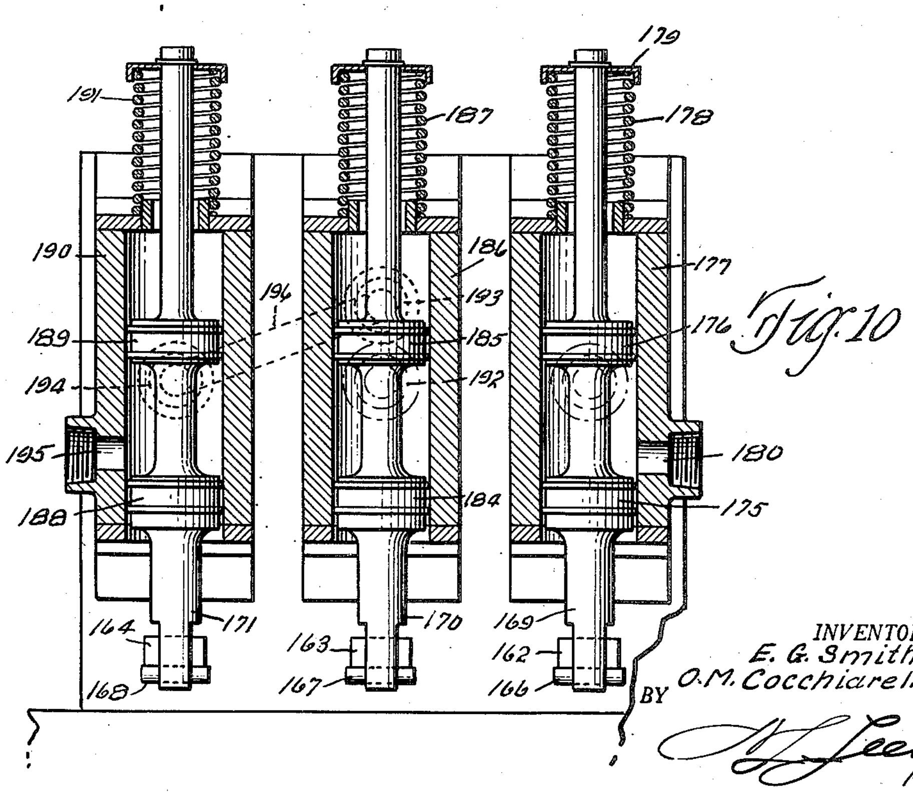
Figs. 10, 11 and 12 are sections taken on the line 10—10 of Fig. 6 showing the valves in different positions.
Figure 11:
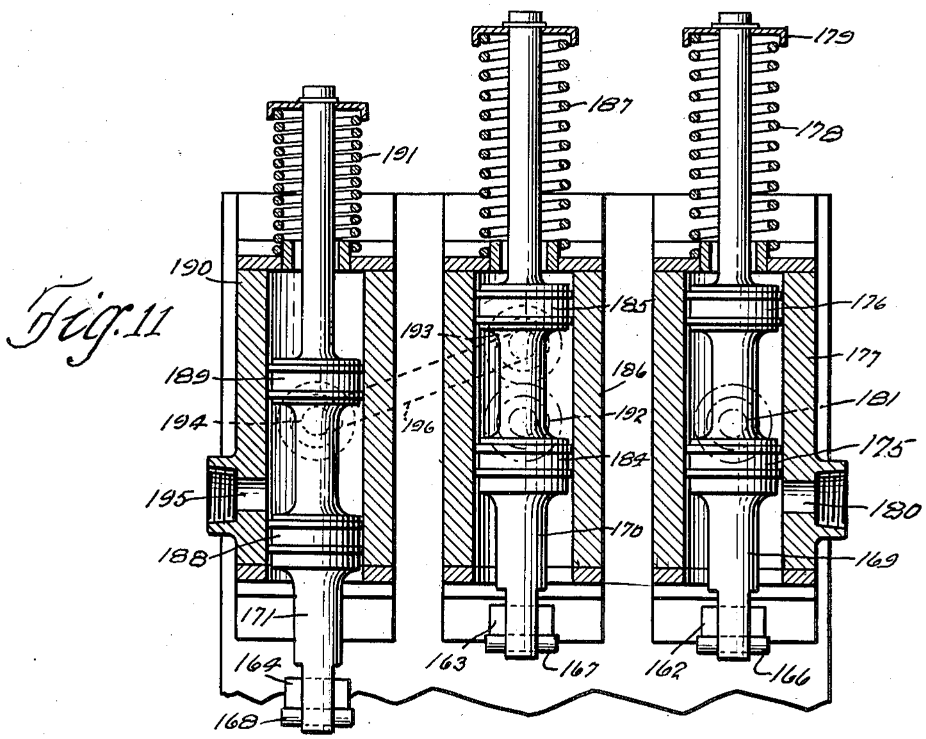
Figure 12:
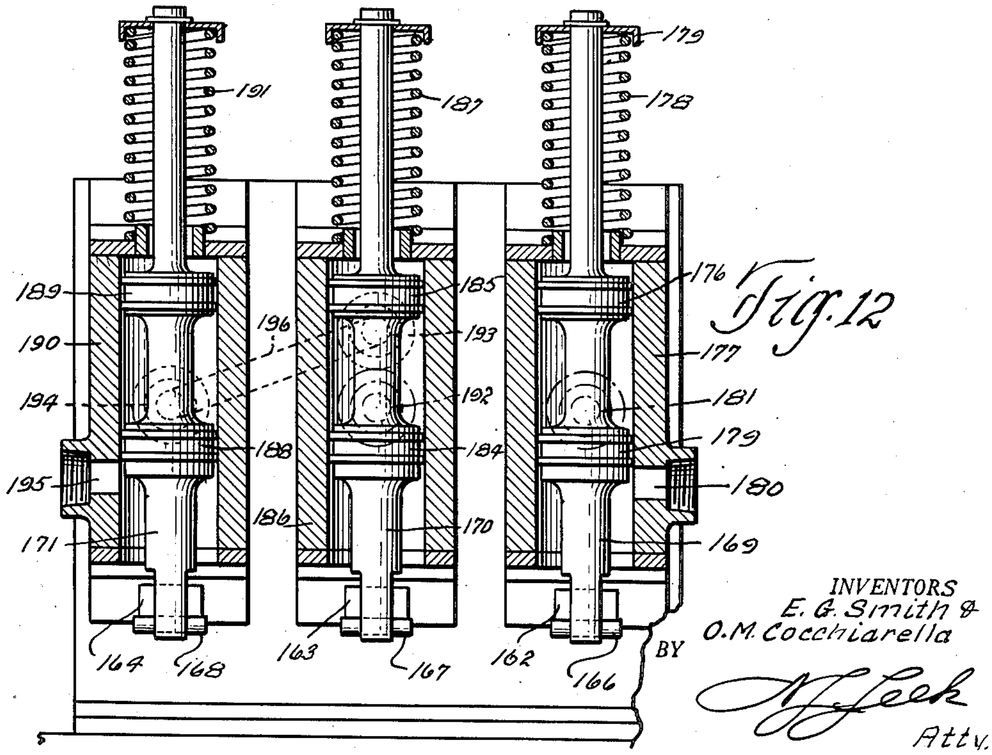

Referring now to the timing of the cams, it will be noted that in Figs. 14 to 17 the reference line *a—a* indicates the position of the various cams at a predetermined time. The relative times of the drop off of the different cam followers is indicated by the angle between the line O—O of each cam and the horizontal line. From the position shown in Fig. 15 the cam 153*a* is about to reach the drop-off point. In this position all of the cam followers 156 to 158 are riding on the high portions of the cam as indicated in Fig. 9 and all of the valves are held in their downward position as indicated in Fig. 10. In this position suction is applied to the pipe 246 through the cylinder 177 and suction is cut-off from the pipe 196 and hence from the pipe 258 by the piston 185 in the cylinder 186. Suction is thus applied to the diaphragm 245 of the valve 241 to hold that valve open, but is cut off from the diaphragm 257 of the valve 256. Hence that valve is closed. The followers 129 and 138 are also engaging the high points on their respective cams so that the lever 104 is held to the right as shown in Fig. 4, the follower 60 is out of contact with the cam 58 and the tubes stationary. This position of the cams represents the end of the filtering period. Slight further movement of the cams causes the follower 156 to drop off of the high portion of the cam 153*a*, thereby raising the piston 175 of the cylinder 177 to the position shown in Fig. 11 and cutting off the suction to the pipe 246. This closes the valve 241 and ends the filtering stage of the cycle. Almost immediately thereafter the cam follower 157 rides off of the high portion of the cam 154 to raise the piston 185 which establishes communication between the suction port 192 and the pipe 196, thence through the cylinder 190 to the suction port 195 to apply suction to the pipe 258 and open the valve 256. The return liquid thence flows rapidly from the head tank 253 into the manifold 34. This position of the valves is shown in Fig. 11. When the cams have rotated a slight further amount as indicated by the angle of the line O—O in Fig. 17, the follower 158 rides off of the high portion of the cam 155 to thereby elevate the piston 188 of the cylinder 190 to the position shown in Fig. 12. This cuts off the suction to the outlet port 195 and cuts off the suction to the pipe 258 thereby closing the valve 256 and ending the blow-back period. It is thus evident that the extent of the blow-back period depends upon the relative angular settings of the cams 154 and 155 and may be adjusted as desired. Furthermore, by using the drop off portion of each cam for initiating and stopping the blow-back period respectively, the valve 256 may be opened and closed substantially instantaneously. Hence the quantity of return liquid may be accurately controlled.

Upon further rotation of the various cams, the follower 129 drops off of the high portion of the cam 61, the follower 138 still engaging the high portion of the cam 62. This releases the lever 104 and permits the follower 60 to engage the cam 58. Rapid rotation of the cam 58 causes the arm 59 and the rod 93 to reciprocate rapidly, which in turn oscillates the shaft 86 and causes the tubes 33 to shake or oscillate in the tank 30. This continues until further rotation of the cams allows the follower 138 to ride off of the high portion of the cam 62, thereby bringing the end 135 of the lever 131 into alignment with the abutment 136 and stopping the oscillation of the tubes as above described. In practice, the cams may be so timed that only two or three complete oscillations take place. This completes the operating cycle.

In order to set up the next cycle the follower 156 first rides up on the high portion of the cam 153, again applying suction to the line 246 to open the valve 241. As the respective followers 157 and 158 are caused to ride up on the high portions of the cams 154 and 155, the valve 186 is first closed by lowering of the piston 185 and the valve 190 is then opened by lowering of the piston 188, thereby restoring the parts to the condition shown in Fig. 10.

While the system has been described as so timed that its blow-back period precedes the shaking, it is obvious that the cams may be so set that the shaking or oscillating of the tubes takes place during the blow-back if desired. While the blow-back assists in loosening the filter cake it is applicants' belief that the filter cake is principally removed due to the distortion of the fabric itself during the shaking period and that the principal object of the blow-back is to relieve the suction on the filter cake before and during the shaking of the tubes.

Although a specific embodiment of the invention has been shown for purposes of illustration, it is to be understood that the invention is capable of various uses and that changes and adaptations may be made therein as will be readily apparent to a person skilled in the art. The invention is only to be restricted in accordance with the scope of the following claims.

What is claimed is:

1. The method of removing a filter cake from a tube filter having a tubular surface composed of a flexible filter material which comprises, at the end of the filter period, returning liquid to the interior of said tube filter to cause the material to balloon out, then rapdily oscillating said filter laterally with respect to its axis in said slurry to cause the filter material to balloon out, first in one direction and then in the other on its trailing side so as to dislodge the filter cake therefrom.

2. A method of operating a tube thickener comprising a tube carrying a layer of filter material thereon, which comprises first applying suction to said tube to draw the filtrate through said material and cause a filter cake to deposit on the surface thereof, then breaking said suction and applying return liquid to said tube to cause said material to balloon out away from the surface of said tube, then interrupting the supply of return liquid and oscillating said tube laterally with respect to its axis in the surrounding slurry for a predetermined period of time so as to cause the filter material to balloon out on the trailing side of the moving tube first on one side and then on the other side as the tube oscillates for dislodging the filter cake therefrom.

3. A tube thickener comprising a tank for a slurry to be thickened, a tube carrying a fabric filter material around its periphery immersed in said slurry, said fabric being free of said tube to balloon out therefrom around a substantial portion of its periphery, a suction pipe connected to said tube for applying suction to draw filtrate through said filter material and to cause a filter cake to deposit thereon, a suction control valve connected in said suction pipe to control the suction of said tube, a return pipe carrying return liquid connected to supply return liquid to said tube, a return liquid valve connected in said return pipe to control the flow of the return liquid from said return pipe to said tube, a driving member connected to oscillate said tube laterally with respect to its axis in said slurry to cause the filter material to balloon out on its trailing side, first on one side of the tube and then on the other as the tube is oscillated, and timed means having means operating automatically and in timed sequence and connected to first open said suction control valve for filtering, then to close said suction control valve and to open said return liquid valve for a predetermined accurately timed period to supply return liquid to said tube, then actuate said driving member to oscillate said tube so as to dislodge the filter cake therefrom, and then repeat said operations cyclically.

4. A tube thickener, as set forth in claim 3, in which said tube is disposed vertically in said slurry and said oscillating means is connected to oscillate said tube horizontally therein.

5. A tube thickener, as set forth in claim 3, including a plurality of said tubes, a manifold mounted to rotate about a vertical axis, a plurality of tubular arms extending radially outward therefrom, one of said tubes carrying filter material being mounted on each of said arms and extending vertically in said slurrry, said oscillating means being connected to oscillate said manifold about said vertical axis to cause lateral oscillation of said tubes in said slurry.

6. A tube thickener, as set forth in claim 3, in which pressure responsive devices are connected to actuate said suction control valve and said return liquid valve and said timed means includes connected means to control the pressure supplied to said devices.

7. A tube thickener, as set forth in claim 3, in which said oscillating means comprises a rotating cam, a cam follower is arranged to engage and be actuated by said cam and is connected to oscillate said tube, and a holding cam is arranged to hold said follower out of engagement with said rotating cam to interrupt the oscillation of said tube during selected periods.

8. In a tube thickener, as set forth in claim 7, latch means connected to hold said cam follower out of engagement with said holding cam, and an additional cam rotating with the holding cam arranged to release said latch means.

9. A tube thickener comprising a tank for a slurry to be thickened, a tube carrying a fabric filter material around its periphery immersed in said slurry, said fabric being free of said tube to balloon out therefrom around a substantial portion of its periphery, a suction pipe connected to said tube for applying suction to draw filtrate through said filter material and to cause a filter cake to deposit thereon, a suction control valve connected in said suction pipe to control the suction of said tube, a return pipe carrying return liquid connected to supply return liquid to said tube, a return liquid valve connected in said return pipe to control the flow of the return liquid from said return pipe to said tube, a driving member connected to oscillate said tube laterally with respect to its axis in said slurry to cause the filter material to balloon out on its trailing side, first on one side of the tube and then on the other as the tube is oscillated, and timed means having means operating automatically and in timed sequence and connected to first open said suction control valve for filtering, then to close said suction control valve and to open said return liquid valve for a predetermined accurately timed period to supply return liquid to said tube, then actuate said driving member to oscillate said tube so as to dislodge the filter cake therefrom, and then repeat said operations cyclically, vacuum responsive means connected to open said return liquid valve in response to suction and to close said return liquid valve when said suction is released, a suction line connected to actuate said vacuum responsive means, and valve means in said suction line comprising a pair of cylinders each having inlet and outlet ports and a slidable piston therein adapted to establish or break communication between the respective inlet and outlet ports, said ports being connected to connect said cylinders in series in said suction line and so arranged that actuation of one piston opens the suction line to apply suction to said vacuum responsive means for opening said return valve and subsequent actuation of the second piston releases the suction on said vacuum responsive means for closing said return valve.

10. In a tube thickener, as set forth in claim 9, rotary cams having followers connected to actuate said pistons, each of said cams having a sharp drop-off portion adapted to produce rapid actuation of the responsive pistons.

11. In a tube thickener, as set forth in claim 10, means for adjusting the relative timing of said cams for thereby controlling the open period of said return valve.

12. A tube thickener, comprising a tank for a slurry to be thickened, a tube carrying a fabric filter material around its periphery immersed in said slurry, said fabric being free of said tube to balloon out therefrom around a substantial portion of its periphery, a suction pipe connected to said tube for applying suction to said tube to draw filtrate through said filter material and to deposit a filter cake thereon, a return pipe carrying return liquid connected to supply return liquid to said tube to loosen the filter cake, means to oscillate said tube laterally in a direction substantially normal to its axis in said slurry to cause the filter material to balloon out on its trailing side, first on one side of the tube and then on the other as the tube is oscillated to dislodge said cake, and timed means having means operating automatically and in timed sequence and connected to control the suction period for filtering, the flow of return liquid to said tube, and the period of oscillating said tube.

13. In a tube thickener, a tank for a slurry to be thickened, a filter tube disposed vertically in said tank and carrying fabric filter material around its periphery, said fabric being free of said tube to balloon out therefrom around a substantial portion of its periphery, means to oscillate said tube laterally in a direction substantially normal to its axis in said tank to cause the filter material to balloon out on its trailing side, first on one side of the tube and then on the other as the tube is oscillated, and timed means to control said oscillation.

14. In a tube thickener, a tank for a slurry to be thickened, a filter tube disposed vertically in said tank and carrying a filter fabric around its periphery, a driving member connected to oscillate said tube laterally in a direction substantially normal to its axis in said tank to cause the fabric to balloon out on its trailing side, first on one side of the tube and then on the other as the tube is oscillated, timed means to control said oscillation, and attaching members attaching said fabric to said tube intermediate its ends only along a longitudinal line lying in a diametric plane of the tube extending in the direction of oscillation so that the fabric is free to balloon out on both sides of said longitudinal line.

15. The method of thickening a slurry which comprises immersing therein a tube carrying a filter material around its periphery, applying suction to the interior of said filter for drawing filtrate therethrough and depositing a filter cake thereon, breaking said suction and supplying return liquid to said filter for equalizing the pressure therein, and rapidly oscillating said filter laterally with respect to its axis in said slurry to cause the filter material to balloon out on its trailing side, first on one side of the tube and then on the other as the tube is oscillated to dislodge the filter cake therefrom.

EDMUND G. SMITH.
OTELL M. COCCHIARELLA.

REFERENCES CITED

The following references are of record in the file of this patent:

UNITED STATES PATENTS

| Number | Name | Date |
|---|---|---|
| 1,169,725 | Kilby | Jan. 25, 1916 |
| 1,263,226 | Genter | Apr. 16, 1918 |
| 1,359,162 | Genter | Nov. 16, 1920 |
| 1,591,229 | Oliver et al. | July 6, 1926 |
| 1,642,673 | Genter | Sept. 20, 1927 |
| 1,724,436 | Sweetland | Aug. 13, 1929 |
| 1,843,639 | Hansen | Feb. 2, 1932 |
| 2,392,666 | Harris | Jan. 8, 1946 |

FOREIGN PATENTS

| Number | Country | Date |
|---|---|---|
| 579,326 | France | July 30, 1924 |